(12) United States Patent
Gan et al.

(10) Patent No.: US 11,272,436 B2
(45) Date of Patent: Mar. 8, 2022

(54) COMMUNICATION METHOD AND APPARATUS

(71) Applicant: HUAWEI TECHNOLOGIES CO., LTD., Shenzhen (CN)

(72) Inventors: Ming Gan, Shenzhen (CN); Dandan Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/878,373

(22) Filed: May 19, 2020

(65) Prior Publication Data

US 2020/0280905 A1 Sep. 3, 2020

Related U.S. Application Data

(63) Continuation of application No. PCT/CN2019/071445, filed on Jan. 11, 2019.

(30) Foreign Application Priority Data

Nov. 15, 2018 (CN) .......................... 201811361768.6
Nov. 30, 2018 (WO) ................ PCT/CN2018/118720

(51) Int. Cl.
*H04W 48/16* (2009.01)
*H04W 48/08* (2009.01)
(Continued)

(52) U.S. Cl.
CPC .......... *H04W 48/16* (2013.01); *H04B 17/364* (2015.01); *H04L 5/0048* (2013.01); *H04L 5/0053* (2013.01); *H04W 8/005* (2013.01); *H04W 24/10* (2013.01); *H04W 48/08* (2013.01); *H04W 48/10* (2013.01); *H04W 72/0453* (2013.01); *H04W 72/1278* (2013.01); *H04W 76/11* (2018.02); *H04W 84/12* (2013.01)

(58) Field of Classification Search
None
See application file for complete search history.

(56) References Cited

U.S. PATENT DOCUMENTS

2007/0213012 A1 9/2007 Marin et al.
2009/0016306 A1 1/2009 Wang et al.
(Continued)

FOREIGN PATENT DOCUMENTS

CN 102238681 A 11/2011
CN 103748953 A 4/2014
(Continued)

OTHER PUBLICATIONS

Cordeiro "Fixes to multi-band operations," IEEE 802.11-18/1324r3, total 12 pages, Institute of Electrical and Electronics Engineers, New York, New York (Jul. 2018).
(Continued)

*Primary Examiner* — Adnan Baig
(74) *Attorney, Agent, or Firm* — Leydig, Voit & Mayer, Ltd.

(57) ABSTRACT

The application provides an information indication method, including generating a first frame, where the first frame includes address information of a station operating on a frequency band of 6 GHz; and transmitting the first frame on a 2.4 GHz and/or 5 GHz frequency band.

20 Claims, 6 Drawing Sheets

(51) Int. Cl.
- *H04B 17/364* (2015.01)
- *H04W 76/11* (2018.01)
- *H04L 5/00* (2006.01)
- *H04W 8/00* (2009.01)
- *H04W 24/10* (2009.01)
- *H04W 48/10* (2009.01)
- *H04W 72/04* (2009.01)
- *H04W 72/12* (2009.01)
- *H04W 84/12* (2009.01)

(56) References Cited

U.S. PATENT DOCUMENTS

| | | | |
|---|---|---|---|
| 2014/0010223 A1* | 1/2014 | Wang | H04W 76/11 370/338 |
| 2014/0064128 A1 | 3/2014 | Park et al. | |
| 2015/0282063 A1 | 10/2015 | Patil et al. | |
| 2016/0205615 A1* | 7/2016 | Seok | H04W 48/16 370/338 |
| 2017/0070930 A1* | 3/2017 | Cariou | H04W 36/24 |
| 2017/0255659 A1 | 9/2017 | Cariou et al. | |
| 2019/0098565 A1* | 3/2019 | Cherian | H04W 48/18 |
| 2019/0174577 A1 | 6/2019 | Patil et al. | |
| 2019/0297632 A1* | 9/2019 | Huang | H04L 61/3075 |
| 2020/0037325 A1 | 1/2020 | Chu et al. | |
| 2020/0112910 A1 | 4/2020 | Cherian et al. | |
| 2020/0221545 A1 | 7/2020 | Stacey et al. | |

FOREIGN PATENT DOCUMENTS

| | | |
|---|---|---|
| CN | 104704885 A | 6/2015 |
| CN | 104956735 A | 9/2015 |
| CN | 105052235 A | 11/2015 |
| CN | 106165496 A | 11/2016 |
| WO | 2014025216 A1 | 2/2014 |

OTHER PUBLICATIONS

"Part 11: Wireless LAN Medium Access Control (MAC) and Physical Layer (PHY) Specifications," IEEE Computer Society,Sponsored by the LAN/MAN Standards Committee, IEEE Std 802.11-2016 (Revision of IEEE Std 802.11-2012), total 3534 pages, Institute of Electrical and Electronics Engineers, New York, New York (Dec. 7, 2016).

Part 11: Wireless LAN Medium Access Control (MAC) and Physical Layer (PHY) Specifications Amendment 6: Enhancements for High Efficiency WLAN, IEEE P802.11ax/D2.0, total 596 pages, Institute of Electrical and Electronics Engineers, New York, New York (Oct. 2017).

"Part 11: Wireless LAN Medium Access Control (MAC) and Physical Layer (PHY) Specifications," IEEE P802.11-REVmd/D1. 6, total 4594 pages, Institute of Electrical and Electronics Engineers, New York, New York (Oct. 2018).

Cariou et al., "CR for 6GHz—Discovery, IEEE 802.11-18/1227r8," total 6 pages (Jan. 18, 2017).

Derham et al., "Considerations on 6 GHz Discovery," IEEE 802.11-18/1922r0, total 14 pages (Nov. 12, 2018).

EP/19885340, Search Report, dated Mar. 18, 2021.

\* cited by examiner

| TBTT Information Header | Operating Class | Channel Number | TBTT Information Set |
|---|---|---|---|

Octets: 2     1     1     variable

FIG. 3

| B0   B1 | B2 | B3 | B4    B7 | B8    B15 |
|---|---|---|---|---|
| TBTT Information Field Type | Filtered Neighbor AP | Reserved | TBTT Information Count | TBTT Information Length |

Bits:    2     1     1     4     8

FIG. 4

| Neighbor AP TBTT Offset | BSSID (optional) (11ai) | Short-SSID (optional) (11ai) |
|---|---|---|

Octets: 1     0 or 6     0 or 4

FIG. 5

| TBTT Information Header | Operating Class | Channel Number | TBTT Information Set |
|---|---|---|---|

Octets: 2     1     1     variable

FIG. 6

| B0 B1 | B2 | B3 | B4 B7 | B8 B15 |
|---|---|---|---|---|
| TBTT Information Field Type | Filtered Neighbor AP | Reserved | TBTT Information Count | TBTT Information Length |

Bits: 2, 1, 1, 4, 8

FIG. 7

| Neighbor AP TBTT Offset | BSSID (optional) (11ai) | Short-SSID (optional) (11ai) | BSS Parameters |
|---|---|---|---|

Octets: 1, 0 or 6, 0 or 4, 0 or 1

FIG. 8

| B0 | B1 B7 |
|---|---|
| Transmitted BSSID | Reserved |

Bits: 1, 7

FIG. 9A

| Neighbor AP TBTT Offset | BSSID (optional) (11ai) | Short-SSID (optional) (11ai) | BSS Parameters |
|---|---|---|---|
| Octets: 1 | 0 or 6 | 0 or 4 | 0 or 1 |

| B0 | B1 | B2 | B7 |
|---|---|---|---|
| OCT Supported | Transmitted BSSID | Reserved | |
| Bits: 1 | 7 | 6 | |

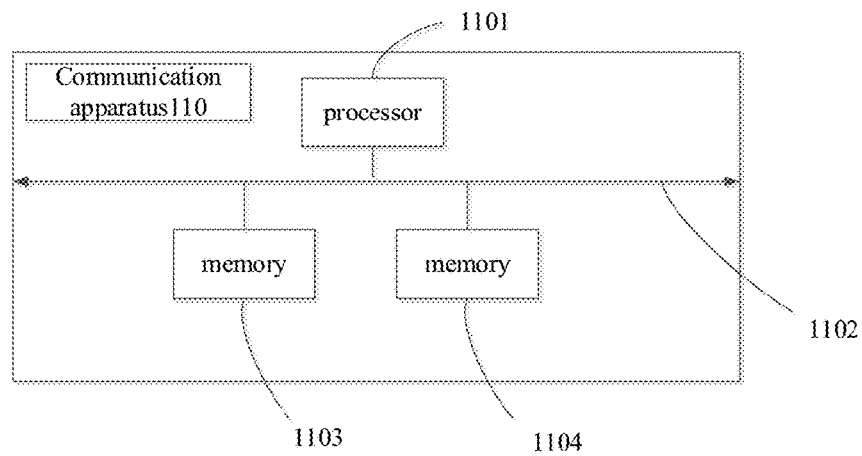
FIG. 15
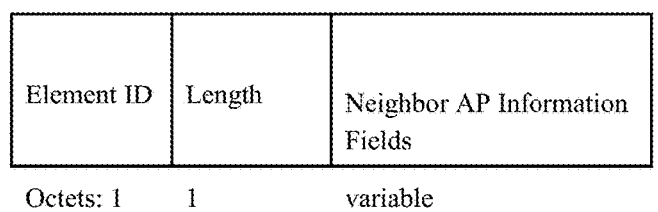
FIG. 16
| B0 | B1 | B2 | B3 | B4 | B5 | B6 | B7 |
|---|---|---|---|---|---|---|---|
| OCT Recommended | Same SSID | Multiple BSSID | Transmitted BSSID | Member Of Co-located ESS | 20 TU Probe Response Active | Reserved | |
| Bits 1 | 1 | 1 | 1 | 1 | 1 | 2 | |
FIG. 17

COMMUNICATION METHOD AND APPARATUS

CROSS-REFERENCE TO RELATED APPLICATIONS

This application is a continuation of International Application No. PCT/CN2019/071445, filed on Jan. 11, 2019, which claims priority to International Patent Application No. PCT/CN2018/118720, filed on Nov. 30, 2018, and Chinese Patent Application No. 201811361768.6, filed on Nov. 15, 2018. The disclosures of the aforementioned applications are hereby incorporated by reference in their entireties.

TECHNICAL FIELD

The present application relates to the field of communications technologies, and in particular, to a communication method and apparatus.

BACKGROUND

The 802.11 family standards for wireless local area networks are defined by the Institute of Electrical and Electrical Engineers (IEEE). Among them, the 802.11 series mainstream standards currently have 802.11a, 802.11b, 802.11n, 802.11ac and 802.11ax standards.

The next-generation 802.11 standard, which requires forward compatibility, will also support the 802.11ax's operating spectrum, including 2.4 GHz, 5 GHz and 6 GHz bands. According to the latest free 6 GHz frequency band, channel division based on this frequency band can support more than 160 MHz maximum bandwidth supported at 5 GHz, such as 240 MHz, 320 MHz or 400 MHz. In addition to the extremely large bandwidth, the next-generation 802.11 series standard can increase peak throughput by increasing the number of streams, such as increasing the number of streams to 16 streams, and cooperating among multiple bands (such as 2.4 GHz, 5 GHz, and 6 GHz). How to quickly find or conveniently access the 6 GHz band or other bands different from 2.4 GHz and 5 GHz is a technical problem to be solved.

SUMMARY

The embodiments of the present application provide a communication method, apparatus, and device, which are used to solve the problem of accessing different frequency bands efficiently in the prior art.

In one aspect, an information indication method is provided, including: generating a first frame, the first frame includes address information of a station operating on a 6 GHz band; and transmitting the first frame on a 2.4 GHz and/or 5 GHz frequency band.

In another aspect, an information indicating method includes: receiving, by a station, a first frame on a 2.4 GHz and/or 5 GHz band, the first frame containing address information of one or more reported APs on a 6 GHz band sent by a reporting AP; transmitting, by the station, a second frame on the 6 GHz band, and the received address of the second frame is the address information of one of the reported APs on the 6 GHz band, or, transmitting, by the station, an OCT MMPDU (MAC (media access control) management protocol data unit) on the 2.4 GHz and/or 5 GHz band, and the received address of the OCT MMPDU is a MAC address of the reporting AP.

Of course, the 6 GHz band in the above embodiment can be replaced with other bands, such as 1 GHz to 7 GHz, except for 2.4 GHz and 5 GHz.

In specific examples, the address information is located in a RNR element or a NR element, or, a RNR element of the first frame may include indication information for indicating whether the address information is present. Specifically, the address information is a MAC address of the AP on the 6 GHz band or a BSSID of the reported AP on the 6 GHz band.

In an example, if the reported AP on the 6 GHz band is a member of a multiple BSSID set, the BSSID of the reported AP on the 6 GHz band is a transmitted BSSID of the multiple BSSID set. In another example, if the reported AP on the 6 GHz band is a member of a multiple BSSID set, a short SSID in the RNR element is calculated based on the SSID of the AP that has transmitted BSSID. In another example, if the reported AP on the 6 GHz band is a member of a multiple BSSID set, the RNR or NR element includes signal to indicate that if the BSSID of the reported AP in the RNR or NR element is a transmitted BSSID of a multiple BSSID set.

Specifically, the RNR element or the NR element of the first frame may further comprise at least one of the three parameters: an operating class main channel, whether OCT is supported, and a Co-located AP.

Optionally, the RNR element or the NR element may include signal to indicate that if the reported AP on the 6 GHz band is co-located with the reporting AP which transmits the first frame. Or, the RNR element or the NR element may include signal to indicate that if the reported AP on the 6 GHz band and the reporting AP which transmits the first frame are in multiple bands supported device.

Accordingly, an apparatus capable of performing any of the aforementioned methods is provided.

In another aspect, a communication apparatus is provided, comprising: a processor, a memory, and a communication interface; the processor controls a communication action of the communication interface; the memory stores a program; the processor invokes a program stored in the memory, the method of any of the preceding solutions.

In another aspect, a storage medium is provided having stored thereon a computer program, wherein the computer program is executed by a processor to implement the method of any of the preceding methods.

According to the above embodiments, the efficiency of communication can be improved, and congestion on the communication band can be reduced.

BRIEF DESCRIPTION OF THE DRAWINGS

FIGS. 3-13 are schematic diagrams of frame structures respectively provided by various embodiments in the present application;

FIG. 14 is a schematic diagram of a communication process according to an embodiment of the present application;

FIG. 15 is a schematic structural diagram of hardware of a communication device according to an embodiment of the present disclosure.

FIG. 16 is a schematic diagram of a RNR element.

FIG. 17 is a schematic diagram of BSS Parameters subfield format.

DETAILED DESCRIPTION

Figure 1:
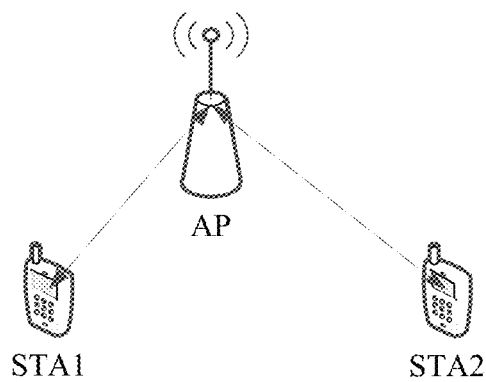
FIG. 1 is a schematic diagram of an application architecture of an embodiment of the present application.

FIG. 1 is a schematic diagram of an application architecture of an embodiment of the present application. As shown in FIG. 1, the number of access points (APs) is 1, and the number of stations (STAs) is 2. The application architecture of the example may include: AP, STA1, and STA2. Among them, AP1 is connected to STA1 and STA2, STA1 is connected to STA2, and AP can also communicate with other APs. It should be noted that the communication method provided by the embodiment of the present application may be applicable to communication between an AP and an AP, communication between a STA and a STA, and communication between an AP and an STA. The AP can serve as the receiving end or the transmitting end. The STA can serve as the receiving end or the transmitting end.

The AP includes but is not limited to a communication server, a router, a switch, a bridge, etc., and the STA includes, but is not limited to, a computer, a mobile phone, and the like.

Figure 2:
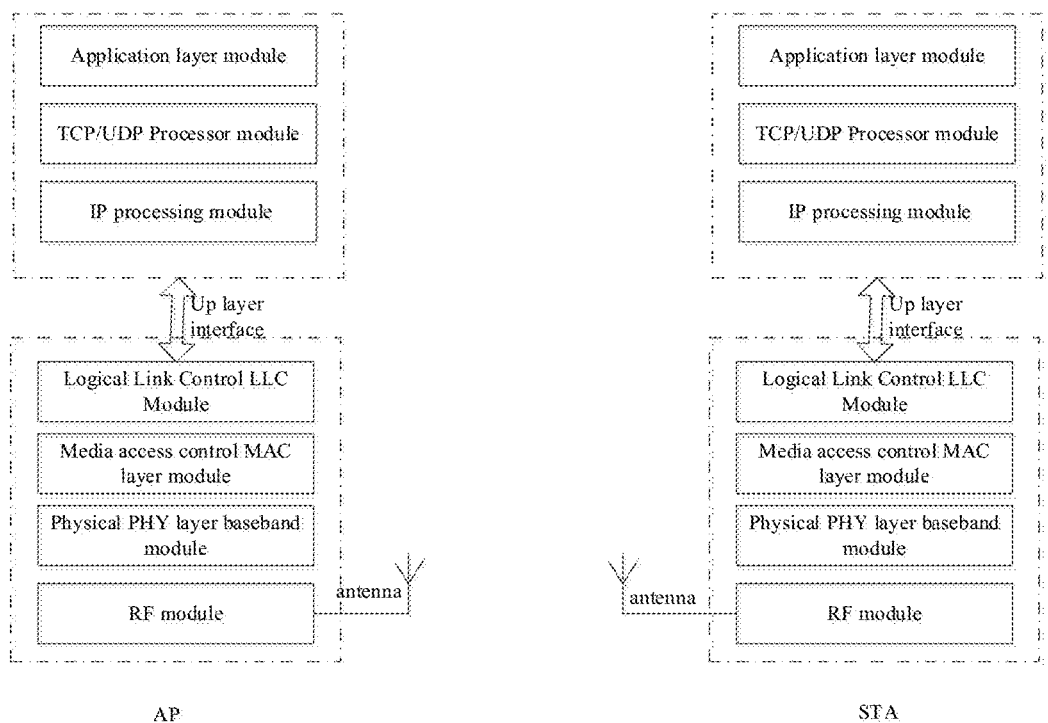
FIG. 2 is a schematic diagram of an internal structure of an AP and a STA according to an embodiment of the present application.

As shown in FIG. 2, the internal structure of the AP and the STA may include, for example, an antenna, a radio module, a physical (PHY) layer baseband module, a media access control (MAC) layer module, and a logical chain. Log link control (LLC) module, internet protocol (IP) processing module, transmission control protocol/user datagram protocol TCP/UDP) processing module and application The layer module, the IP module and the LLC module can communicate through the upper layer interface. The number of antennas may be one or more, and the number of antennas of the STA and the AP may be the same or different.

It should be noted that the above APs and STAs may support or be compatible with one or more standards of the 802.11 series, such as but not limited to 802.11\802.11a\802.11b\802.11002.11n\802.11ac\802.11ax\802.11ax next generation or other sub-criteria are not described in this application.

802.11ax task group voted to extend the scope of the project to operation up to 7.125 GHz, in order to enable 802.11ax operation in the 6 GHz band, which spans from 5935 MHz to 7125 MHz.

It is expected that all APs on(in) 6 GHz band, except soft APs, is a multi-band collocated device operating on 6 GHz band and on 2.4 and/or 5 GHz band. Scanning more than 1.2 GHz of spectrum is very demanding time-wise and energy-wise. In order to reduce this impact on resource overhead at 6 GHz and energy and time consumption on STA side, in one of our embodiments the 6 GHz APs (that are collocated with another AP in a lower band) can be discovered by scanning the lower bands (2.4 and 5 GHz).

For example, it is mandated that the APs collocated in the lower bands (2.4 or 5 GHz band) include a reduced neighbor report or neighbor report element describing the 6 GHz collocated AP.

Based on the above embodiment, a STA that scans 2.4 and 5 GHz band will have (or obtain) information it requires to decide if it wants to associate with one of the 6 GHz APs. The embodiment may further includes that the STA further obtains as much information as it would get by sending a probe request to the 6 GHz AP. When it wants to associate with the 6 GHz AP, the STA only needs to send one frame: an association request. In this way, the complexity of the STA accessing the 6 GHz AP can be greatly reduced, and the communication efficiency is improved.

In an embodiment, a discovery mechanism for 2.4, 5 and 6 GHz is described:

The STA to detect of the operating channels of the BSSs that are available for the association.

The STA to detect the BSSs that are collocated with the reporting device (AP), i.e. an virtual AP operating in the same device that has transmitted the discovery information.

BSS Transition Management signaling is enhanced to be able to transition to collocated 6 GHz BSSs, details are included in the following disclosure.

Optionally, the embodiment also includes providing the information that the AP supports OCT (on-channel tunneling). The OCT is a mechanism already defined in the subclause 11.33.4 On-channel Tunneling (OCT) operation in 802.11-2016 standard: Tunneling between the reporting device and the AP in 6 GHz to tunnel probe request/response, association and authentication frames that are transmitted over-the-air to the AP in lower band and tunneled to the AP at 6 GHz.

The above mentioned mechanisms reduce scanning, authentication and association signaling overhead on 6 GHz band, but they do not intend to replace the direct scanning, authentication and association on 6 GHz band. That is, based on capability of a station, the station may process direct scanning, authentication and association on 6 GHz band.

The procedure of OCT can be referred to the subclause 11.33.4 On-channel Tunneling (OCT) operation and 6.3.91 On-channel Tunneling operation in 802.11-2016 standard. OCT allows a STA of a multi-band capable device to transmit an MMPDU that was constructed by a different STA of the same device.

In an embodiment, at the transmitting side, use Reduced Neighbor Report (RNR) or Neighbor Report (NR) element in Beacons or Probe Responses, for example, in 2.4 GHz and\or 5 GHz band, to broadcast the info of 6 GHz AP (address information), such as to help the STA to discover the AP in 6 GHz. In another aspect, at the receiving side, in 2.4 GHz and\or 5 GHz band, receiving a first frame, the first frame comprises address information of the STA work on\in the 6 GHz band; sending by the receiving side, a second frame in the 6 GHz band, the receiver address of the second frame is the received address information of the STA work in the 6 GHz band.

Specifically, if the reported AP, i.e., a 6 GHz AP, is a member of a multiple basic service set identifier (BSSID) set with two or more members, a simple scheme is provided such that the STA can get the whole profile of the Multiple BSSID set quickly. A RNR element or NR element does not need to provide all the profiles for each BSSID in the Multiple BSSID set, but just provide the info related to transmitted BSSID such that to save air time, make it clean, and no ambiguous to the receiver. According to Draft P802.11ax_D1.0 and Draft P802.11REVmd_D1.6, now only the AP with transmitted BSSID can provide the whole picture\entire information to the STA through a beacon frame or probe response such that the STA can find a proper AP in multiple BSSID set to do association.

The above mentioned BSS Transition Management signaling may have different frame structure, for example, a management frame carrying a Reduced Neighbor Report (RNR) element or a Neighbor Report (NR) element. The following are embodiments of the structure of the elements.

Reduced Neighbor Report Element

The Reduced Neighbor Report element contains channel and other information related to neighbor APs. The format of the Reduced Neighbor Report element is shown in FIG. 16 (Reduced Neighbor Report element format). It can carry the information related to more than one reported AP by having more than one Neighbor AP Information Fields.

The Element ID and Length fields are defined in 9.4.2.1 in Draft P802.11REVmd_D1.6

The Neighbor AP Information Fields field contains one or more of the Neighbor AP Information field described in 9.4.2.170.2 (Neighbor AP Information field) in Draft P802.11REVmd_D1.6. Please refer to P802.11REVmd_D1.6 or 802.11-2016 for the sub-clause mentioned in this disclosure.

Neighbor AP Information Field

Option 1

The Neighbor AP Information field specifies target beacon transmission time (TBTT) and other information related to a group of neighbor APs on one channel. See FIG. 3.

The format of TBTT Information Header subfield is defined in FIG. 4.

The TBTT Information Field Type subfield is 2 bits in length and identifies, together with the TBTT Information Length subfield, the format of the TBTT Information field. It is set to 0.). (11ai)Values 1, 2, and 3 are reserved.

The Filtered Neighbor AP subfield is 1 bit in length. (11ai) When included in a Probe Response frame, it is set to 1 if the service set identifier (SSID) corresponding to every AP in this Neighbor AP Information field matches the SSID in the (11ai)corresponding Probe Request frame. (11ai) When included in a Beacon or FILS Discovery frame transmitted by a non-television very high throughput (TVHT) AP, it is set to 1 if the SSID corresponding to every AP in this Neighbor AP Information field matches the SSID of the transmitting AP's BSS. It is set to 0 otherwise. (11ai) The TBTT Information Count subfield is 4 bits in length and contains the number of TBTT Information fields included in the TBTT Information Set field of the Neighbor AP Information field, minus one. For example, a value of 0 indicates that one TBTT Information field is included.

The TBTT Information Length subfield is 1 octet in length and indicates the length of each TBTT Information field included in the TBTT Information Set field of the Neighbor AP Information field. When the TBTT Information Field Type subfield is set to 0, the TBTT Information Length subfield:

contains the length in octets of each TBTT Information field that is included in the TBTT Information Set field of the Neighbor AP Information field is set to 1, 5, 7, or 11; other values are reserved.(11ai)

indicates the TBTT Information field contents as shown in Table 9-273 (TBTT Information field content(11ai)).

A TVHT AP sets the TBTT Information Length subfield to 1.

(11ai) The TBTT Information Length subfield is interpreted as shown in Table 1. That is, TBTT Information field(11ai) contents (9-283 in standard as reference)

TABLE 1

| TBTT Information Length subfield value | TBTT Information field contents |
| --- | --- |
| 1 | The Neighbor AP TBTT Offset subfield |
| 5 | The Neighbor AP TBTT Offset subfield and the Short-SSID subfield |
| 7 | The Neighbor AP TBTT Offset subfield and the BSSID subfield |

TABLE 1-continued

| TBTT Information Length subfield value | TBTT Information field contents |
| --- | --- |
| 11 | The Neighbor AP TBTT Offset subfield, the BSSID subfield and the Short-SSID subfield |
| 0, 2-4, 6, 8-10, 12-255 | Reserved |

The Operating Class field is 1 octet in length and indicates a channel starting frequency that, together with the Channel Number field, indicates the primary channel of the BSSs of the APs in this Neighbor AP Information field. Values of Operating Class are shown in Table E-4 (Global operating classes), of which operating classes that, together with the channel number, indicate the primary channel is valid (see 11.49 (Reduced neighbor report)).

NOTE—The Operating Class field and Channel Number tuple indicate the primary channel in order to assist with passive scanning.

The Channel Number field is 1 octet in length and indicates the last known primary channel of the APs in this Neighbor AP Information field. Channel Number is defined within an Operating Class as shown in Table E-4 (Global operating classes).

The TBTT Information Set field contains one or more TBTT Information fields. The TBTT Information field is defined in FIG. 4.

The Neighbor AP TBTT Offset subfield is 1 octet in length and indicates the offset in TUs (time units), rounded down to nearest TU, to the next TBTT of an AP from the immediately prior TBTT of the AP that transmits this element. The value 254 indicates an offset of 254 TUs or higher. The value 255 indicates an unknown offset value.

The BSSID is defined in 9.2.4.3.4 (BSSID field).(11ai). If the reported AP indicated/carried in the Neighbor AP Information field is a member of a multiple BSSID set with two or more members, the BSSID field is set to the transmitted BSSID.

The Short-SSID subfield is calculated as given in 9.4.2.170.3 (Calculating the Short-SSID (Hai). If the reported AP indicated/carried in the Neighbor AP Information field is a member of a multiple BSSID set with two or more members, Short SSID is computed based on the SSID of the AP that has transmitted BSSID.

Where a Multiple BSSID set as defined in Draft P802.11ax_D3.0 and Draft P802.11REVmd_D1.6 is characterized as follows:

All members of the set use a common operating class, channel, Channel Access Functions, and antenna connector.

The set has a maximum range of 2n for at least one n, where $1<=n<=46$.

Members of the set have the same 48-n bits (BSSID[0: (47-n)]) in their BSSIDs.

All BSSIDs within the multiple BSSID set are assigned in a way that they are not available as MAC addresses for STAs using a different operating class, channel or antenna connector. The BSSID of an AP belonging to a multiple BSSID set is referred to as the transmitted BSSID if the AP includes the Multiple BSSID element in the Beacon frame that it transmits. In a multiple BSSID set, there shall not be more than one AP corresponding to the transmitted BSSID. The BSSID of an AP belonging to a multiple BSSID set is a non-transmitted BSSID if the AP's BSSID is derived according to 9.4.2.46 (Multiple BSSID element) and 9.4.2.74 (Multiple BSSID-Index element) in Draft P802.11REVmd_D1.6. Among all AP STAs in multiple BSSID set, only the AP corresponding to the transmitted BSSID shall transmit a Beacon frame.

In this option, the RNR is only allowed to carry the information of the AP that has transmitted BSSID if the reported AP indicated/carried in the Neighbor AP Information field is a member of a multiple BSSID set with two or more members, and does not carry the information of the AP that has non-transmitted BSSID if the reported AP indicated in the Neighbor AP Information field is a member of a multiple BSSID set with two or more members, that is to say. All the information carried in RNR are about the AP that has transmitted BSSID in this case. Moreover, the fields or bits in RNR element can be further modified or added for other functions, i.e., changing "reserved" in TBTT Information Header subfield to "Co-located AP", and/or adding BSS parameters field in TBTT Information field as those in option 3.

Scheme 1: Note that Co-located AP is defined to the APs which share the same antenna connector with the reporting STA as defined in P802.11-2016.

Scheme 2: Note that Co-located AP here is not limited to the APs which share the same antenna connector with the reporting STA, but also refers to the APs which does not share the same antenna connector with the reporting STA but in the same physical device. Rename it as Co-device AP to differentiate the terminology "Co-located" in P802.11REVmd_D2.0.

Option 2

The Neighbor AP Information field specifies TBTT and other information related to a group of neighbor APs on one channel. See FIG. 5.

The format of TBTT Information Header subfield is defined in FIG. 6.

The TBTT Information Field Type subfield is 2 bits in length and identifies, together with the TBTT Information Length subfield, the format of the TBTT Information field. It is set to 0 . . . (11ai)Values 1, 2, and 3 are reserved.

The Filtered Neighbor AP subfield is 1 bit in length. (11ai) When included in a Probe Response frame, it is set to 1 if the SSID corresponding to every AP in this Neighbor AP Information field matches the SSID in the (11ai) corresponding Probe Request frame. (11ai) When included in a Beacon or FILS Discovery frame transmitted by a non-TVHT AP, it is set to 1 if the SSID corresponding to every AP in this Neighbor AP Information field matches the SSID of the transmitting AP's BSS. It is set to 0 otherwise. (11ai) The TBTT Information Count subfield is 4 bits in length and contains the number of TBTT Information fields included in the TBTT Information Set field of the Neighbor AP Information field, minus one. For example, a value of 0 indicates that one TBTT Information field is included.

The TBTT Information Length subfield is 1 octet in length and indicates the length of each TBTT Information field included in the TBTT Information Set field of the Neighbor AP Information field. When the TBTT Information Field Type subfield is set to 0, the TBTT Information Length subfield:

contains the length in octets of each TBTT Information field that is included in the TBTT Information Set field of the Neighbor AP Information field is set to 1, 5, 7, 8, 11 or 12; other values are reserved. (11ai)

indicates the TBTT Information field contents as shown in Table 9-273 (TBTT Information field content(11ai)).

A TVHT AP sets the TBTT Information Length subfield to 1.

(11ai) The TBTT Information Length subfield is interpreted as shown in Table 2 TBTT Information field. That is, TBTT Information field(11ai) contents (9-283).

TABLE 2

| TBTT Information Length subfield value | TBTT Information field contents |
|---|---|
| 1 | The Neighbor AP TBTT Offset subfield |
| 5 | The Neighbor AP TBTT Offset subfield and the Short-SSID subfield |
| 7 | The Neighbor AP TBTT Offset subfield and the BSSID subfield |
| 11 | The Neighbor AP TBTT Offset subfield, the BSSID subfield and the Short-SSID subfield |
| 8 | The Neighbor AP TBTT Offset subfield, the BSSID subfield, and the BSS Parameters subfield |
| 12 | The Neighbor AP TBTT Offset subfield, the BSSID subfield, the Short-SSID subfield and the BSS Parameters subfield |
| 0, 2-4, 6, 9-10, 13-255 | Reserved |

The Operating Class field is 1 octet in length and indicates a channel starting frequency that, together with the Channel Number field, indicates the primary channel of the BSSs of the APs in this Neighbor AP Information field. Values of Operating Class are shown in Table E-4 (Global operating classes), of which operating classes that, together with the channel number, indicate the primary channel is valid (see 11.49 (Reduced neighbor report)).

NOTE—The Operating Class field and Channel Number tuple indicate the primary channel in order to assist with passive scanning.

The Channel Number field is 1 octet in length and indicates the last known primary channel of the APs in this Neighbor AP Information field. Channel Number is defined within an Operating Class as shown in Table E-4 (Global operating classes).

The TBTT Information Set field contains one or more TBTT Information fields. The TBTT Information field is defined in FIG. 8 (TBTT Information field(11ai) format).

The Neighbor AP TBTT Offset subfield is 1 octet in length and indicates the offset in TUs, rounded down to nearest TU, to the next TBTT of an AP from the immediately prior TBTT of the AP that transmits this element. The value 254 indicates an offset of 254 TUs or higher. The value 255 indicates an unknown offset value.

The BSSID is defined in 9.2.4.3.4 (BSSID field). (Calculating the Short-SSID) (11ai).

The Short-SSID subfield is calculated as given in 9.4.2.170.3 (11ai).

In 802.11ai, BSSID is optionally present in TBTT Information field in RNR element, however, BSSID is necessity for 6 GHz AP or other band AP discovery. Hence, to ensure to help the STA to find the 6 GHz AP or other band AP, the following rules should be made BSSID is not present in TBTT Information field in RNR element if the reported AP carried in Neighbor AP Information field of the RNR element has the same MAC address or BSSID as the reporting AP which transmits the RNR element; BSSID is present in TBTT Information field in RNR element if the reported AP carried in Neighbor AP Information field of the RNR element does not have the same MAC address or BSSID as the reporting AP which transmits the RNR element.

Or BSSID is always presented in in TBTT Information field in RNR element.

In BSS Parameters subfield, there is one bit or field to indicate if the reported AP carried in Neighbor AP Information field of the RNR element has the same BSSID as the reporting AP which transmits the RNR element, call it Same BSSID subfield. Set to 1 or the first value to indicate the reported AP carried in Neighbor AP Information field of the RNR element has the same BSSID as the reporting AP which transmits the RNR element; Set to 0 or the second value to indicate the reported AP carried in Neighbor AP Information field of the RNR element does not have the same BSSID as the reporting AP which transmits the RNR element.

In scheme one:

The format of BSS Parameters subfield is defined in FIG. 9A (9-622 as reference) (BSS Parameters subfield). The Transmitted BSSID subfield is set to 1 or the first value (more than 1 bit in the Transmitted subfield) to indicate the reported AP indicated/carried in the Neighbor AP Information field is a member of a multiple BSSID set with two or more members and has transmitted BSSID (the BSSID field in TBTT Information field is set to transmitted BSSID), or the reported AP operating on the channel indicated/carried by Channel Number field and Operating Class field in the Neighbor AP Information field is not a member of a multiple BSSID set with two or more members, and set to 0 or the second value (more than 1 bit in the Transmitted subfield) otherwise (to indicate the reported AP indicated/carried in the Neighbor AP Information field is a member of a multiple BSSID set with two or more members and has non-transmitted BSSID (the BSSID field in TBTT Information field is set to non-transmitted BSSID). More general, there is one bit or one field in RNR element instead of Transmitted BSSID subfield to indicate if the reported AP indicated/carried in the Neighbor AP Information field is a member of a multiple BSSID set with two or more members and has transmitted BSSID.

Moreover, in the BSS Parameters subfield format, it also can have another bit or field to indicate if the reported AP is a member of a multiple BSSID set with two or more members. Set it to the first value to indicate the reported AP is a member of a multiple BSSID set with two or more members, and set it to the second value to indicate the reported AP is not a member of a multiple BSSID set with two or more members.

In scheme two:

The format of BSS Parameters subfield is defined in FIG. 9A (9-622 as reference)(BSS Parameters subfield). The Transmitted BSSID subfield is set to 1 or the first value (more than 1 bit in the Transmitted subfield) to indicate the reported AP indicated/carried in the Neighbor AP Information field has transmitted BSSID of the Multiple BSSID set (the BSSID field in TBTT Information field is set to transmitted BSSID), and set to 0 or the second value (more than 1 bit in the Transmitted subfield) otherwise (to indicate the reported AP indicated/carried in the Neighbor AP Information field has non-transmitted BSSID of the Multiple BSSID set or is not a member of a multiple BSSID set with two or more members). More general, there is one bit or one field in RNR element instead of Transmitted BSSID subfield to indicate if the reported AP indicated/carried in the Neighbor AP Information field is a member of a multiple BSSID set with two or more members and has transmitted BSSID.

Moreover, in the BSS Parameters subfield format, it also can have another bit or field to indicate if the reported AP is a member of a multiple BSSID set with two or more members. Set it to the first value to indicate the reported AP is a member of a multiple BSSID set with two or more members, and set it to the second value to indicate the reported AP is not a member of a multiple BSSID set with two or more members.

Figure 9B:
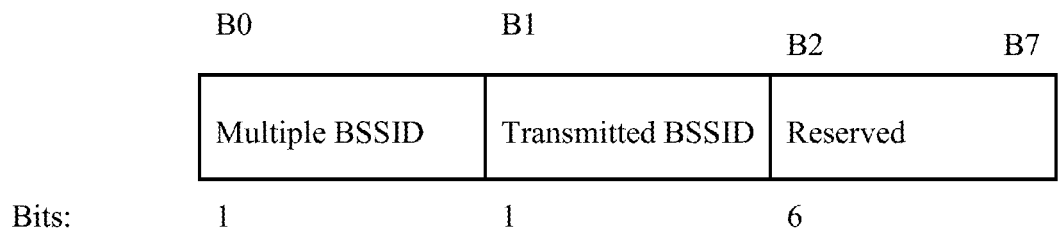

In scheme three:

The format of BSS Parameters subfield is defined in FIG. 9B.

Multiple BSSID subfield is set to 1 to indicate the AP reported in the Neighbour AP Information field is a member of a multiple BSSID set with two or more members, and set to 0 to indicate the AP reported in the Neighbour AP Information field is not a member of a multiple BSSID set with two or more members.

If Multiple BSSID subfield is 1, the Transmitted BSSID subfield is set to 1 to indicate the AP reported in the Neighbour AP Information field has transmitted BSSID, and set to 0 to indicate the AP reported in the Neighbour AP Information field has non-transmitted BSSID.

If Multiple BSSID subfield is 0, the Transmitted BSSID subfield is reserved

Generally speaking, the TBTT information field as shown in FIG. 8 contains the parameters of one reported AP. So in the case of the reported AP in a Multiple BSSID set, the Neighbor AP TBTT Offset, BSSID, Short-SSID, BSS Parameters are the parameters for the AP that has transmitted BSSID if the reported AP has transmitted BSSID, or, are the parameters for the AP that has non-transmitted BSSID if the reported AP has non-transmitted BSSID. However, Neighbor AP TBTT Offset in TBTT information field is not very useful if the TBTT information field carries the information of a reported AP of Non-transmitted BSSID because either AP of Non-transmitted BSSID would not transmit a beacon or a beacon transmitted by the AP of Non-transmitted BSSID would not contain a Multiple BSSID element (do not provide the whole information of all the APs in the Multiple BSSID set). But in this disclosure, Neighbor AP TBTT Offset in TBTT information field is reused as for other function if the TBTT information field carry the information of a reported AP of Non-transmitted BSSID.

Scheme 1:

In order to help a receiver to know when a beacon is transmitted by an AP that has transmitted BSSID, if a received TBTT information field in RNR element is for one neighbor AP that has non-transmitted BSSID, set Neighbor AP TBTT Offset subfield to be the value of TBTT offset of an AP that has transmitted BSSID, wherein the AP that has transmitted BSSID and the reported AP that has non-transmitted BSSID are in a same Multiple BSSID. Note that only the beacon transmitted by the AP that has transmitted BSSID can contain Multiple BSSID set element such that it can provide the whole profile, including the information of other one or more APs that have non-transmitted BSSID in the same Multiple BSSID set. That is to say, if the Multiple BSSID subfield is 1 and the Transmitted BSSID subfield is set to 0, and the Neighbor AP TBTT Offset subfield is set to be TBTT offset of the AP that has transmitted BSSID in the same Multiple BSSID as that reported AP that has non-transmitted BSSID.

Note that TBTT offset of the AP that has transmitted BSSID have the same definition as defined in TBTT Information field, The Neighbor AP TBTT Offset subfield is 1 octet in length and indicates the offset in TUs, rounded down to nearest TU, to the next TBTT of an AP from the immediately prior TBTT of the AP that transmits this element. The value 254 indicates an offset of 254 TUs or higher. The value 255 indicates an unknown offset value.

Other setting are as follows:

BSSID subfield is set to BSSID of that reported AP that has non-transmitted BSSID, Short SSID subfield is computed based on the SSID of that reported AP that has non-transmitted BSSID, BSS parameters subfield carries some important parameters for that reported AP that has non-transmitted BSSID, such as OCT Supported, Transmitted BSSID, Multiple BSSID.

Scheme 2:

In order to help a receiver to know what is the transmitted BSSID when the received TBTT information field in RNR element is for one neighbor AP that has non-transmitted BSSID, reuse Neighbor AP TBTT Offset subfield to carry a value of BSSID of an AP that has transmitted BSSID, wherein the AP that has transmitted BSSID and the reported AP that has non-transmitted BSSID are in the same Multiple BSSID. The value of BSSID of the AP that has transmitted BSSID can be Partial BSSID of the AP that has transmitted BSSID, i.e., 8 or 4 least significant bits of BSSID of the AP that has transmitted BSSID, or Max BSSID Indicator (i.e., 8 or 4 bits) as defined in Multiple BSSID element which can be used to derive the value of transmitted BSSID.

Note that only the beacon, Probe Response frame transmitted by the AP that has transmitted BSSID can contain Multiple BSSID set element such that it can provide the whole profile, including the information of other one or more AP that have non-transmitted BSSID in the same Multiple BSSID set. That is to say, if Multiple BSSID subfield is 1 and Transmitted BSSID subfield is set to 0, some bits of Neighbor AP TBTT Offset subfield is reused to carry the value of BSSID of the AP that has transmitted BSSID in the same Multiple BSSID as that reported AP that has non-transmitted BSSID.

Other setting are as follows:

BSSID subfield is set to BSSID of that reported AP that has non-transmitted BSSID, Short SSID subfield is computed based on the SSID of that reported AP that has non-transmitted BSSID, BSS parameters subfield carries some important parameters for that reported AP that has non-transmitted BSSID, such as OCT Supported, Transmitted BSSID, Multiple BSSID.

Scheme 3:

In order to help a receiver to know what is the transmitted BSSID and when the beacon are transmitted by the AP that has transmitted BSSID if the received TBTT information field in RNR element is for one neighbor AP that has non-transmitted BSSID, reuse Neighbor AP TBTT Offset subfield to carry the value of BSSID and TBTT of the AP that has transmitted BSSID, wherein the AP that has transmitted BSSID and the reported AP that has non-transmitted BSSID are in the same Multiple BSSID. The value of BSSID of the AP that has transmitted BSSID can be Partial BSSID of the AP that has transmitted BSSID, i.e., 8 or 4 least significant bits of BSSID of the AP that has transmitted BSSID, or MaxBSSID Indicator (i.e., 8 or 4 bits) as defined in Multiple BSSID element which can be used to derive the value of transmitted BSSID. The value of TBTT of the AP that has transmitted BSSID can be partial TBTT offset of TBTT of the AP that has transmitted BSSID compared with TBTT of the reporting AP, or partial TBTT of the AP that has transmitted BSSID.

Note that only the beacon, Probe Response frame transmitted by the AP that has transmitted BSSID can contain Multiple BSSID set element such that it can provide the whole profile, including the information of other AP(s) that have non-transmitted BSSID in the same Multiple BSSID set. That is to say, if Multiple BSSID subfield is 1 and Transmitted BSSID subfield is set to 0, some bits (i.e., 4 bits) of Neighbor AP TBTT Offset subfield is reused to carry the value of BSSID of the AP that has transmitted BSSID, wherin the AP that has transmitted BSSID and the reported AP that has non-transmitted BSSID are in the same Multiple BSSID. Some bits (i.e., 4 bits) of Neighbor AP TBTT Offset subfield is reused to carry the value of TBTT of the AP that has transmitted BSSID in the same Multiple BSSID as that reported AP that has non-transmitted BSSID, i.e., partial TBTT offset of TBTT of the AP that has transmitted BSSID compared with TBTT of the reporting AP.

Note that partial TBTT offset of the AP that has transmitted can be n least significant bits of TBTT offset as defined in TBTT information field, and also can be have the following definition.

The Neighbor AP TBTT Offset subfield is n bits in length, $n=1, 2, \ldots$ or 7 and indicates the offset in m TUs, $m=1, 2, \ldots$ or 16, rounded down to nearest TU, to the next TBTT of an AP from the immediately prior TBTT of the AP that transmits this element. The value $2^n-1$ indicates an unknown offset value or higher than $(2^n-2)*m$ TUs. Another method is, the value $2^n-2$ indicates an offset of $(2^n-2)*m$ TUs or higher. The value $2^n-1$ indicates an unknown offset value.

Other setting are as follows:

BSSID subfield is set to BSSID of that reported AP that has non-transmitted BSSID, Short SSID subfield is computed based on the SSID of that reported AP that has non-transmitted BSSID, BSS parameters subfield carries some important parameters for that reported AP that has non-transmitted BSSID, such as OCT Supported, Transmitted BSSID, Multiple BSSID.

Other 6 reserved bits can be used for other function, i.e., using one bit to indicate that if the OCT procedure described in 11.33.4 (On-channel Tunnelling (OCT) operation) defined in 802.11-2016 can be used to exchange management frames with the AP described in this TBTT Information field through over-the-air transmissions with the AP sending the Reduced Neighbour Report.

More general, there is one bit or one field in RNR element instead of Multiple BSSID subfield to indicate the reported AP indicated/carried in the Neighbor AP Information field is a member of a multiple BSSID set with two or more members, i.e., The TBTT Information Field Type subfield is set to 1 to indicate the AP reported in the Neighbor AP Information field is a member of a multiple BSSID set (i.e., operated by an AP with dot11MultiBSSIDActivated set to true), in this case, the setting Transmitted BSSID subfield is the same as Multiple BSSID subfield of 1 value.

In this option, the RNR is allowed to carry the information of both the AP that has transmitted BSSID and the AP that has Non-transmitted BSSID if the reported AP indicated/carried in the Neighbor AP Information field is a member of a multiple BSSID set with two or more members. But this option needs an extra indication to tell the receiver which reported AP has transmitted BSSID or not.

In the BSS Parameters subfield, it also can have another bit or field to indicate if the reported AP is in multiband capable device (support multiband).

Moreover, the fields or bits in RNR element can be further modified or added for other functions, i.e., changing "reserved" in TBTT Information Header subfield to "Co-located AP" as that in option 3.

Another embodiment for BSS Parameters subfield is as shown in FIG. 17.

The OCT Recommended subfield is set to 1 to indicate that OCT is recommended to be used to exchange MGMT MMPDUs with the AP indicated in the TBTT Information field, through over-the-air transmissions with the AP sending the Reduced Neighbor Report. It is set to 0 otherwise.

The Same SSID subfield is set to 1 to indicate that the reported AP has the same SSID as the reporting AP. It is set to 0 otherwise.

The Multiple BSSID subfield is set to 1 to indicate that the reported AP is part of a multiple BSSID set. It is set to 0 otherwise.

The Transmitted BSSID subfield is set to 1 to indicate that the reported AP is a transmitted BSSID. It is set to 0 it the reported AP is a non-transmitted BSSID. It is reserved if the Multiple BSSID subfield is set to 0.

The Member of Co-located ESS (extended service set) subfield is set to 1 if the reported AP is part of an ESS where all the APs operating in the same band as the reported AP (irrespective of the operating channel) in the local coverage area have a co-located AP operating at 2.4 or 5 GHz. It is set to 0 otherwise or if it does not have that information.

The 20 TU Probe Response Active subfield is set to 1 if the reported AP is part of an ESS where all the APs that operate in the corresponding channel in the local coverage area are transmitting unsolicited Probe Response frames every 20 TUs (see 27.16.1a.1.1). It is set to 0 otherwise or if it does not have that information.

The AP that has transmitted BSSID is recommended not to transmit Probe Response every 20 TU. So the following setting is as follows If the Multiple BSSID subfield is set to 1 and the Transmitted BSSID subfield is set to 0, the 20 TU Probe Response Active subfield is reserved.

If the Multiple BSSID subfield is set to 1 and Transmitted BSSID subfield is set to 0, some bits of BSS Parameters subfield are used carry the value of BSSID and TBTT of the AP that has transmitted BSSID, wherein the AP that has transmitted BSSID and the reported AP that has non-transmitted BSSID are in the same Multiple BSSID to carry the value of BSSID and TBTT of the AP that has transmitted BSSID in the same Multiple BSSID as that reported AP that has non-transmitted BSSID. The value of BSSID of the AP that has transmitted BSSID can be Partial BSSID of the AP that has transmitted BSSID, i.e., 4 least significant bits of BSSID of the AP that has transmitted BSSID, or MaxBSSID Indicator (i.e., 4 bits) as defined in Multiple BSSID element which can be used to derive the value of transmitted BSSID. It can reuse 20 TU Probe Response Active subfield, the remaining 2 bits the value of BSSID and TBTT of the AP that has transmitted BSSID and other bits.

Option 3

Figure 10:
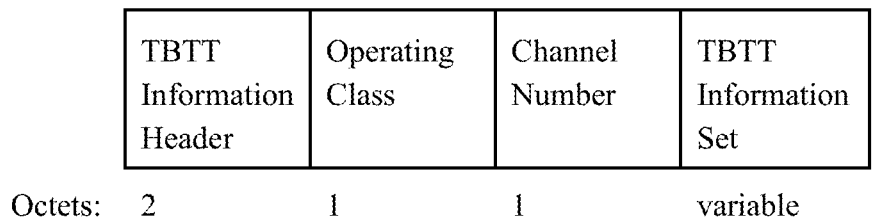

The Neighbor AP Information field specifies TBTT and other information related to a group of neighbor APs on one channel. See FIG. 10.

Figure 11:
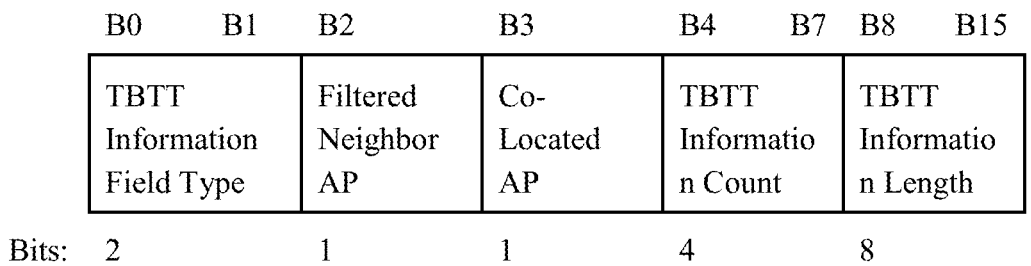

The format of TBTT Information Header subfield is defined in FIG. 11.

The TBTT Information Field Type subfield is 2 bits in length and identifies, together with the TBTT Information Length subfield, the format of the TBTT Information field. It is set to 0. (11ai)Values 1, 2, and 3 are reserved.

The Filtered Neighbor AP subfield is 1 bit in length. (11ai) When included in a Probe Response frame, it is set to 1 if the SSID corresponding to every AP in this Neighbor AP Information field matches the SSID in the (11ai) corresponding Probe Request frame. (11ai) When included in a Beacon or FILS Discovery frame transmitted by a non-TVHT AP, it is set to 1 if the SSID corresponding to every AP in this Neighbor AP Information field matches the SSID of the transmitting AP's BSS. It is set to 0 otherwise. (11ai)

The Co-Located AP subfield is 1 bit in length and is set to 1 if the reported AP that operates on the channel indicated by Channel Number field and Operating Class field in the Neighbor AP Information field is co-located with the reporting AP, and is set to 0 otherwise.

The TBTT Information Count subfield is 4 bits in length and contains the number of TBTT Information fields included in the TBTT Information Set field of the Neighbor AP Information field, minus one. For example, a value of 0 indicates that one TBTT Information field is included.

The TBTT Information Length subfield is 1 octet in length and indicates the length of each TBTT Information field included in the TBTT Information Set field of the Neighbor AP Information field. When the TBTT Information Field Type subfield is set to 0, the TBTT Information Length subfield:

contains the length in octets of each TBTT Information field that is included in the TBTT Information Set field of the Neighbor AP Information field is set to 1, 5, 7, 8, 11 or 12; other values are reserved. (11ai)

indicates the TBTT Information field contents as shown in Table 9-273 (TBTT Information field content(11ai)).

A TVHT AP sets the TBTT Information Length subfield to 1.

(11ai) The TBTT Information Length subfield is interpreted as shown in Table 3. That is, TBTT Information field(11ai) contents.

TABLE 3

| TBTT Information Length subfield value | TBTT Information field contents |
|---|---|
| 1 | The Neighbor AP TBTT Offset subfield |
| 5 | The Neighbor AP TBTT Offset subfield and the Short-SSID subfield |
| 7 | The Neighbor AP TBTT Offset subfield and the BSSID subfield |
| 11 | The Neighbor AP TBTT Offset subfield, the BSSID subfield and the Short-SSID subfield |
| 8 | The Neighbor AP TBTT Offset subfield, the BSSID subfield, and the BSS Parameters subfield |
| 12 | The Neighbor AP TBTT Offset subfield, the BSSID subfield, the Short-SSID subfield and the BSS Parameters subfield |
| 0, 2-4, 6, 9-10, 13-255 | Reserved |

The Operating Class field is 1 octet in length and indicates a channel starting frequency that, together with the Channel Number field, indicates the primary channel of the BSSs of the APs in this Neighbor AP Information field. Values of Operating Class are shown in Table E-4 (Global operating classes), of which operating classes that, together with the channel number, indicate the primary channel is valid (see 11.49 (Reduced neighbor report)).

NOTE—The Operating Class field and Channel Number tuple indicate the primary channel in order to assist with passive scanning.

The Channel Number field is 1 octet in length and indicates the last known primary channel of the APs in this Neighbor AP Information field. Channel Number is defined within an Operating Class as shown in Table E-4 (Global operating classes).

The TBTT Information Set field contains one or more TBTT Information fields. The TBTT Information field is defined in FIG. 12.

The Neighbor AP TBTT Offset subfield is 1 octet in length and indicates the offset in TUs, rounded down to nearest TU, to the next TBTT of an AP from the immediately prior TBTT of the AP that transmits this element. The value 254 indicates an offset of 254 TUs or higher. The value 255 indicates an unknown offset value.

The BSSID is defined in 9.2.4.3.4 (BSSID field).(11ai). The Short-SSID subfield is calculated as given in (9.4.2.170.3 (Calculating the Short-SSID Llai). Please refer to Option 1 and Option 2 for the case of the reported AP in Multiple BSSID set which is carried in RNR element. Moreover, the reporting AP which transmitting RNR element shall include the Neighbor AP Information field for the reported AP that has transmitted BSSID of Multiple BSSID set. The reporting AP which transmitting RNR element may include the Neighbor AP Information field for the reported AP that has non-transmitted BSSID of Multiple BSSID set for the case of the reported AP in Multiple BSSID set which is carried in RNR element.

In 802.11ai, BSSID is optionally present in TBTT Information field in RNR element, however, BSSID is necessity for 6 GHz AP or other band AP discovery. Hence, to ensure to help the STA to find the 6 GHz AP or other band AP, the following rules should be made 1. when the Co-Located AP subfield is set to 1, BSSID is not present in TBTT Information field in RNR element if the reported AP carried in Neighbor AP Information field of the RNR element has the same MAC address or BSSID as the reporting AP which transmits the RNR element; BSSID is present in TBTT Information field in RNR element if the reported AP carried in Neighbor AP Information field of the RNR element does not have the same MAC address or BSSID as the reporting AP which transmits the RNR element.

2. when the Co-Located AP subfield is set to 0, BSSID is present in TBTT Information field in RNR element.

In BSS Parameters subfield, there is one bit or field to indicate if the reported AP carried in Neighbor AP Information field of the RNR element has the same BSSID as the reporting AP which transmits the RNR element, call it Same BSSID subfield. Set to 1 or the first value to indicate the reported AP carried in Neighbor AP Information field of the RNR element has the same BSSID as the reporting AP which transmits the RNR element; Set to 0 or the second value to indicate the reported AP carried in Neighbor AP Information field of the RNR element does not have the same BSSID as the reporting AP which transmits the RNR element.

Figures 12, 13, 14:
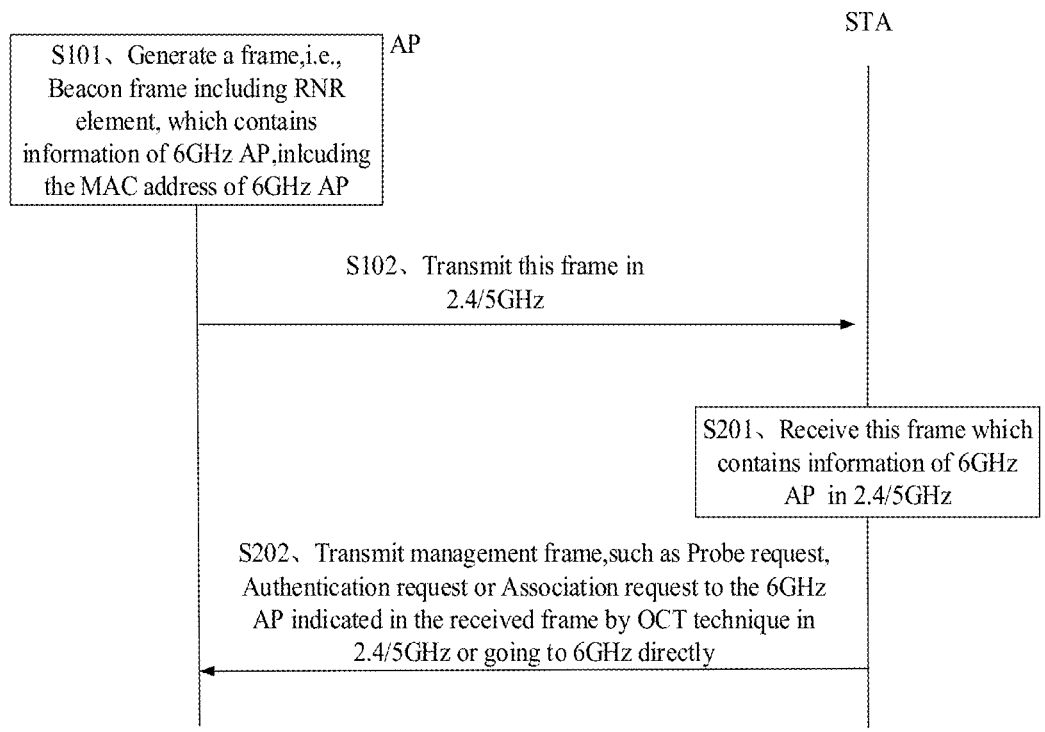

The format of BSS Parameters subfield is defined in FIG. 13.

The OCT Supported subfield is set to 1 to indicate that the OCT procedure described in 11.31.5 (On-channel Tunneling (OCT) operation) can be used to exchange management frames with the AP described in this Neighbor AP Information field through over-the-air transmissions with the AP sending the Reduced Neighbor Report.

Neighbor report element which is defined in 802.11-2016 can also be used to broadcast the information of one or more neighbor APs. One option, using the original neighbor report element which is defined in 802.11-2016; another option is rename one reserved bit in BSSID information field in the neighbor report element to "Co-located AP" which has the same meaning as in option 3.

Any combination of the above three option can be used together.

Out of Band Discovery of 6 GHz BSS

An AP in the device which contains 6 GHz AP that operates in the 2.4 or 5 GHz band, can include in Beacon and Probe Response frames that it transmits a Reduced Neighbor Report element or Neighbor Report element to provide at least the channel(s) and operating class(es) of the AP(s) in the 6 GHz band.

An AP in the device which does not contain 6 GHz AP hat operates in the 2.4 or 5 GHz band, may include in Beacon and Probe Response frames that it transmits a Reduced Neighbor Report element or Neighbor Report element to provide at least the channel(s) and operating class(es) of the AP(s) in the 6 GHz band.

After receiving the information of 6 GHz AP through Reduced Neighbor Report element or Neighbor Report element, the STA can choose OCT (on-channel tunneling) in 2.4/5 GHz or go to 6 GHz to do association with the said AP indicated in Reduced Neighbor Report element or Neighbor Report element. Note Neighbor Report element or Neighbor Report element can be carried in a Management frame, such as Beacon frame, Probe Response frame or Neighbor report frame. There are two methods to do association with 6 GHz AP Note that: the information of 6 GHz AP in RNR or NR can be used for both passive scanning or active scanning Option 1: An AP in the device which contains 6 GHz AP that operates in the 2.4 or 5 GHz band is transparent to the STAs, there is no indication to tell the STA whether an AP in the device which contains 6 GHz AP that operates in the 2.4 or 5 GHz band or not. In this case, the STA cannot use OCT to transmit some management frames on association in 2.4/5 GHz to the AP in 6 GHz because the STA does not know whether the reported AP in 6 GHz is co-located with the reporting AP in 2.4/5 GHz or not.

Option 2: There are some indications, including at least of Co-located AP, Operating Class, Channel Number in the RNR element or the NR element, to tell the STA whether an AP in the device which contains 6 GHz AP that operates in the 2.4 or 5 GHz band or not. In this case, the STA may use OCT to transmit some management frames on association in 2.4/5 Ghz to the AP in 6 GHz because the STA knows whether the reported AP in 6 GHz is co-located with the reporting AP in 2.4/5 GHz or not.

The procedure of Out of band discovery of 6 GHz BSS is described as FIG. 14.

S101. An AP generates a first frame, for example, a Beacon frame including a RNR or a NR element, the frame contains information of a 6 GHz AP; the information may be a MAC address or BSSID of the 6 GHz AP.

S102. The AP transmit the frame in a 2.4 GHz and\or 5 GHz band. The "in" or "on" are used without any difference.

S201. A station (STA) receives the first frame, which contains information of the 6 GHz AP, in the 2.4 GHz and\or 5 GHz band.

S202. The STA transmit a second frame, such as a management frame to request to access the 6 GHz AP indicated by the first frame. In one example, by using the OCT technique, the management frame is sent in the 2.4 GHz and\or 5 GHz band. In another example, the management frame is sent in the 6 GHz band. The management frame may be an Probe request, an Authentication request, an Association request, etc.

The above schemes also can be used to discover AP in other band, i.e. 1-7 GHz.

In Band Discovery of 6 GHz BSS

An AP in the device which contains another 6 GHz AP that operates in the 6 GHz band, can include in Beacon and Probe Response frames that it transmits a Reduced Neighbor Report element or Neighbor Report element to provide at least the channel(s) and operating class(es) of another AP(s) in the 6 GHz band. An AP in the device which does not contain another 6 GHz AP hat operates in the 6 GHz band, may include in Beacon and Probe Response frames that it transmits a Reduced Neighbor Report element or Neighbor Report element to provide at least the channel(s) and operating class(es) of another AP(s) in the 6 GHz band.

After receiving the information of 6 GHz AP through Reduced Neighbor Report element or Neighbor Report element in 6 GHz, the STA can choose OCT (on-channel tunneling) in 6 GHz or go to the channel in 6 GHz indicated in Reduced Neighbor Report element or Neighbor Report element to do association with the said AP indicated in Reduced Neighbor Report element or Neighbor Report element. Note Neighbor Report element or Neighbor Report element can be carried in a Management frame, such as Beacon frame, Probe Response frame or Neighbor report frame.

In another aspect, association can categorized by in channel or out-channel. For in-channel association, after receiving the information of 6 GHz AP through Reduced Neighbor Report element or Neighbor Report element in 6 GHz. the STA can go to the channel in 6 GHz indicated in Reduced Neighbor Report element or Neighbor Report element to do association with the said AP indicated in Reduced Neighbor Report element or Neighbor Report element. For out-channel association, the STA can choose OCT (on-channel tunneling) in 6 GHz indicated in Reduced Neighbor Report element or Neighbor Report element to do association with the said AP indicated in Reduced Neighbor Report element or Neighbor Report element, but in this case, the STA may need to go to the corresponding channel to get received signal strength indication from the corresponding AP.

The Rules of Sending Probe Response for the Case of Multiple BSSID

This embodiment is not limited in a Multiple BSSID which includes 6 GHz band, that is, any Multiple BSSID may use the solution described in the following:

In 802.11a/g/n/ac, the existing rule of sending Probe Response are as follows:

Rule b: A STA that receives a Probe Request frame shall not respond Probe Request Frame if the Address 1 field (RA field) of the Probe Request frame contains an individual address that is not the MAC address of the STA.

However, for the case of Multiple BSSID, if the Address 1 field (RA field) of the Probe Request frame contains an individual address that is not the MAC address of STA1 (AP1), but is the MAC address of STA2 (AP2) that has non-transmitted BSSID, wherein the STA1 (AP1) and STA2 (AP2) are in the same Multiple BSSID, the STA1 (AP1) can be allowed to respond the Probe Response frame. In this way, the STA which transmits the Probe Request frame containing an individual address that is the MAC address of AP of non-transmitted BSSID can get the Probe Response frame (contain Multiple BSSID set element) transmitted by the AP of transmitted BSSID such that it can obtain the whole profile of all the APs in Multiple BSSID set.

If the Multiple BSSID bit is set to 1 (indicating the STA which transmits this Probe Request frame supports Multiple BSSID) in the Extended Capabilities element in the Probe Request frame, the STA (AP) of Non-transmitted BSSID shall not respond to the Probe Request frame.

If the Multiple BSSID bit is set to 1 (indicating the STA which transmits this Probe Request frame supports Multiple BSSID) in the Extended Capabilities element in the Probe Request frame and the Probe request frame contains an individual address that is not the MAC address of STA 1 (AP1) of transmitted BSSID, but is the MAC address of STA2 (AP2) of non-transmitted BSSID, wherein the STA 1 (AP1) and STA2 (AP2) are in the same Multiple BSSID, the STA1 (AP1) of transmitted BSSID can respond Probe Request frame if other exceptions as described in sub clause 11.1.4.3.4 Criteria for sending a response in P802.11REVmd_D2.0 except for Rule b are not met.

The exceptions in P802.11REVmd_D2.0 are as following:

A STA that receives a Probe Request frame shall not respond if any of the following apply:

a) The STA does not match any of the following criteria:
1) The STA is an AP.
2) The STA is an IBSS STA.
3) The STA is a mesh STA.
4) The STA is a DMG STA that is not a member of a PBSS and that is performing active scan as defined in 11.1.4.3.3 (Active scanning procedure for a DMG STA).
5) The STA is a PCP.

b) The Address 1 field of the Probe Request frame contains an individual address that is not the MAC address of the STA.

c) The STA is a non-AP STA in an infrastructure BSS and the Address 1 field of the Probe Request frame contains the broadcast address.

d) The STA is a non-PCP STA in a PBSS and the Address 1 field of the Probe Request frame contains the broadcast address.

e) The STA is in an IBSS and did not transmit a Beacon or DMG Beacon frame since the last TBTT, and the Address 1 field of the Probe Request frame contains the broadcast address.

f) The STA is a mesh STA and either of the following criteria are met:
1) The Probe Request frame does not contain a Mesh ID element.
2) The Mesh ID element in the Probe Request frame is present but does not contain the wildcard Mesh ID and does not match the Mesh ID of the MBSS with which the STA is peered.

g) The STA is not a mesh STA and none of the following criteria are met:
1) The SSID in the Probe Request frame is the wildcard SSID.
2) The SSID in the Probe Request frame matches the SSID of the STA's.
3) The SSID List element is present in the Probe Request frame and includes the SSID of the STA's BSS.

h) The STA is not a mesh STA and the Address 3 field of the Probe Request frame does not contain a wildcard BSSID and does not match the BSSID of the STA's BSS.

i) The STA has dot11InterworkingServiceActivated equal to true and the Probe Request frame contains an Interworking element and an Extended Capabilities element whose Interworking field contains the value 1, and at least one of the following criteria is not met:
1) The HESSID field of the Interworking element is absent, or is present and contains the wildcard HESSID or matches the HESSID field of the InterworkingInfo parameter of the last MLME-START.request or MLME-JOIN.request primitive.

2) The Access Network Type field of the Interworking element contains the wildcard access network type or matches the access network type of the STA.

j) The Probe Request frame contains a DSSS Parameter Set elementi in which the Current Channel field contains a value that is not the same as dot11CurrentChannel.

k) The STA is a DMG STA and the transmit antenna of the DMG STA is not trained to transmit to the STA from which the Probe Request frame was received.

The foregoing various embodiments may be recombined or partially replaced without logical contradiction, and the manner of extension thereof will not be described again. The communication device provided in this embodiment may be used to perform the technical solution on the transmitting side or the receiving end side of the foregoing embodiment, and the implementation principle and the technical effect are similar, and details are not described herein again.

It should be noted that the division of each unit of the above communication device is only a division of a logical function, and may be integrated into one physical entity or physically separated in whole or in part. Moreover, these units may all be implemented in the form of software by means of processing component calls; they may all be implemented in the form of hardware; some units may be implemented by software in the form of processing component calls, and some units are implemented in the form of hardware. For example, the sending unit may be a separately set processing element, or may be integrated in one of the chips of the communication device, or may be stored in the memory of the communication device in the form of a program, which is called by a processing element of the communication device. And the function of the transmitting unit is executed. The implementation of other units is similar. In addition, all or part of these units can be integrated or implemented independently. The processing elements described herein can be an integrated circuit that has signal processing capabilities. In the implementation process, each step of the above method or each of the above units may be completed by an integrated logic circuit of hardware in the processor element or an instruction in a form of software. Further, the above transmitting unit is a unit for controlling transmission, and information can be received by a transmitting device of the communication device, such as an antenna and a radio frequency device.

The above units may be one or more integrated circuits configured to implement the above method, such as one or more Application Specific Integrated Circuits (ASICs), or one or more microprocessors (digital signals processors, DSPs), or one or more Field Programmable Gate Arrays (FPGAs). As another example, when one of the above units is implemented in the form of a processing component scheduler, the processing element can be a general purpose processor, such as a central processing unit (CPU) or other processor that can invoke the program. As another example, these units can be integrated and implemented in the form of a system-on-a-chip (SOC).

FIG. 15 is a block diagram of communication apparatus, such as an access point or a station, according to another embodiment of the present disclosure. The communication apparatus in FIG. 15 comprises an interface 1104, a processor 1101, a bus 1102 a memory 1103 and at least a communication interface 1104.

The processor 1101 can be a central processing unit (CPU), a microprocessor, an application-specific integrated circuit (ASIC), or one or more integrated circuit for controlling the execution of the embodiment of the present application.

Communication bus 1102 can include a path for communicating information between the components described above.

The communication interface 1104 uses a device such as any transceiver for communicating with other devices or communication networks, such as Ethernet, radio access network (RAN), wireless local area networks (WLAN), etc.

The memory 1103 can be a read-only memory (ROM) or other type of static storage device that can store static information and instructions, a random access memory (RAM) or other type that can store information and instructions. The dynamic storage device can also be an electrically erasable programmable read-only memory (EEPROM), a compact disc read-only memory (CD-ROM) or other optical disc storage, and a disc storage device. (including compact discs, laser discs, optical discs, digital versatile discs, Blu-ray discs, etc.), magnetic disk storage media or other magnetic storage devices, or can be used to carry or store desired program code in the form of instructions or data structures and can be Any other media accessed, but not limited to this. The memory can exist independently and be connected to the processor via a bus. The memory can also be integrated with the processor.

The memory 1103 is configured to store application code for executing the solution of the present application, and is controlled by the processor 1101 to execute. The processor 1101 is configured to execute the application code stored in the memory 1103, thereby implementing the communication method provided by the above embodiment of the present application.

Alternatively, in the embodiment of the present application, the processor 1101 may perform the processing related functions in the communication method provided by the foregoing embodiment of the present application, and the communication interface 1104 is responsible for communicating with other devices or the communication network. This example does not specifically limit this.

In a specific embodiment, the processor 1101 may include one or more CPUs.

In a particular embodiment, communication apparatus 110 may include multiple processors. Each of these processors can be a single-CPU processor or a multi-core processor. A processor herein may refer to one or more devices, circuits, and/or processing cores for processing data, such as computer program instructions.

In a specific embodiment, the communication apparatus 110 may further include an output device and an input device. The output device is in communication with the processor 1101 and can display information in a variety of ways. For example, the output device may be a liquid crystal display (LCD), a light emitting diode (LED) display device, a cathode ray tube (CRT) display device, or a projector. The input device is in communication with the processor 1101 and can accept user input in a variety of ways. For example, the input device can be a mouse, a keyboard, a touch screen device, or a sensing device.

In addition, as described above, the communication apparatus 110 provided by the embodiment of the present application may be a chip, or a transmitting end, or a receiving end, or a device having a similar structure in FIG. 15. The embodiment of the present application does not limit the type of the communication apparatus 110.

In the present embodiment, the communication apparatus 110 is presented in a form that divides the various functional modules in an integrated manner. A "module" herein may refer to an Application-Specific Integrated Circuit (ASIC), a circuit, a processor and memory that executes one or more software or firmware programs, integrated logic circuits, and/or other functions that provide the above functionality. Device. In a simple embodiment, those skilled in the art will appreciate that the communication device 110 can take the form shown in FIG. 15. For example, the function/implementation process of the unit mentioned in each embodiment can be implemented by the processor 1101 and the memory 1103 of FIG. 15. Specifically, the generating unit may be executed by calling the application code stored in the memory 1103 by the processor 1101, which is not limited in this embodiment. Alternatively, the sending unit may be implemented by the communication interface 1104 of FIG. 15, which is not limited in this embodiment.

It should be noted that the communication device provided in the embodiment shown in FIG. 15 may specifically be a transmitting end, such as an AP, in the embodiment shown in FIG. 14. When the processor 1101 calls a program stored in the memory 1103, the implementation shown in FIG. 14 may be performed. The method on the transmitting side provided in the example.

It should be noted that the communication device provided in the embodiment shown in FIG. 15 may specifically be the receiving end in the embodiment shown in FIG. 14, for example, a general site. When the processor 1101 calls the program stored in the memory 1103, the device shown in FIG. 14 may be executed. The method of the receiving end side provided by the embodiment.

Optionally, the embodiment of the present application provides a communication system, which may include the communication device or the communication device described in any of the foregoing embodiments.

In the above embodiments, it may be implemented in whole or in part by software, hardware, firmware, or any combination thereof. When implemented using a software program, it may be implemented in whole or in part in the form of a computer program product. The computer program product includes one or more computer instructions. When the computer program instructions are loaded and executed on a computer, the processes or functions described in accordance with embodiments of the present application are generated in whole or in part. The computer can be a general purpose computer, a special purpose computer, a computer network, or other programmable device. The computer instructions can be stored in a computer readable storage medium or transferred from one computer readable storage medium to another computer readable storage medium, for example, the computer instructions can be from a website site, computer, server or data center Transmission to another website site, computer, server or data center via wire (e.g. coaxial cable, fiber optic, Digital Subscriber Line (DSL)) or wireless (e.g. infrared, wireless, microwave, etc.). The computer readable storage medium can be any available media that can be accessed by a computer or a data storage device that includes one or more servers, data centers, etc. that can be integrated with the media. The usable medium may be a magnetic medium (e.g., a floppy disk, a hard disk, a magnetic tape), an optical medium (e.g., a DVD), or a semiconductor medium (such as a Solid State Disk (SSD)) or the like.

What is claims is:

1. A method for indicating information, the method comprising:
    generating, by a reporting access point (AP), a Reduced Neighbor Report (RNR) element carried in a management frame, the RNR element comprising a target beacon transmission time (TBTT) information field for a reported AP, wherein the TBTT information field for the reported AP comprises a basic service set identifier (BSSID) subfield for the reported AP and a neighbor AP TBTT offset subfield for the reported AP; and
    transmitting, by the reporting AP, the RNR element;
    wherein in response to the BSSID subfield for the reported AP being set to a non-transmitted BSSID in a multiple BSSID set, the neighbor AP TBTT offset subfield for the reported AP is set to a value of a TBTT offset of an AP that has a transmitted BSSID from an immediately prior TBTT of the reporting AP that transmits the RNR element, and wherein the AP that has the transmitted BSSID is in the multiple BSSID set that comprises the reported AP, but the AP that has the transmitted BSSID is not the reporting AP;
    wherein in response to the BSSID subfield for the reported AP being set to a transmitted BSSID in a multiple BSSID set or being set to a BSSID that is not in a multiple BSSID set, the neighbor AP TBTT offset subfield for the reported AP is set to a value of a TBTT offset of the reported AP from the immediately prior TBTT of the reporting AP that transmits the RNR element; and
    wherein within the multiple BSSID set the AP that has the transmitted BSSID is the only AP that is allowed to transmit a beacon frame or a probe response, and wherein the reported AP that has the non-transmitted BSSID is not allowed to transmit a beacon frame or a probe response.

2. The method according to claim 1, wherein the TBTT information field further includes a basic service set (BSS) Parameters subfield that comprises a Multiple BSSID subfield and a Transmitted BSSID subfield; and
    wherein the Multiple BSSID subfield is set to 1 and the Transmitted BSSID subfield is set to 0, wherein the neighbor AP TBTT offset subfield is set to indicate an offset in time units (TUs), rounded down to the nearest TU, relative to the next TBTT of the AP that has the transmitted BSSID in the same multiple BSSID set from the immediately prior TBTT of the reporting AP that transmits the RNR element.

3. The method according to claim 1, wherein the TBTT information field further comprises:
    a Short SSID subfield that is computed based on the SSID of the reported AP.

4. The method according to claim 1, wherein the reported AP is on a 6 GHz band, and wherein the reporting AP is on a 2.4 GHz band or a 5 GHz band.

5. The method according to claim 1, wherein the RNR element further comprises at least one of the following:
    a signal indicative of whether the reported AP is co-located with the reporting AP, wherein the reported AP being co-located with the reporting AP corresponds to the reported AP and the reporting AP being in a same physical device; or
    a signal indicative of whether the reported AP and the reporting AP that transmits the RNR element are in a multiple bands supported device.

6. A communication method, comprising:
   receiving, by a station, a Reduced Neighbor Report (RNR) element carried in a management frame, the RNR element comprising a target beacon transmission time (TBTT) information field for a reported access point (AP), wherein the TBTT information field comprise a basic service set identifier (BSSID) subfield for the reported AP and a neighbor AP TBTT offset field for the reported AP; and
   processing, by the station, the RNR element;
   wherein in response to the BSSID subfield for the reported AP being set to a non-transmitted BSSID in a multiple BSSID set, the neighbor AP TBTT offset subfield for the reported AP is set to a value of a TBTT offset of an AP that has a transmitted BSSID from an immediately prior TBTT of a reporting AP that transmits the RNR element, and wherein the AP that has the transmitted BSSID is in the multiple BSSID set that comprises the reported AP, but the AP that has the transmitted BSSID is not the reporting AP;
   wherein in response to the BSSID subfield for the reported AP being set to a transmitted BSSID in a multiple BSSID set or being set to a BSSID that is not in a multiple BSSID set, the neighbor AP TBTT offset subfield for the reported AP is set to a value of a TBTT offset of the reported AP from the immediately prior TBTT of the reporting AP that transmits the RNR element; and
   wherein within the multiple BSSID set the AP that has the transmitted BSSID is the only AP that is allowed to transmit a beacon frame or a probe response, and wherein the reported AP that has the non-transmitted BSSID is not allowed to transmit a beacon frame or a probe response.

7. The method according to claim 6, wherein the TBTT information field further includes a basic service set (BSS) Parameters subfield that comprises a Multiple BSSID subfield and a Transmitted BSSID subfield; and
   wherein the Multiple BSSID subfield is set to 1 and the Transmitted BSSID subfield is set to 0, wherein the neighbor AP TBTT offset subfield is set to indicate an offset in time units (TUs), rounded down to the nearest TU, relative to the next TBTT of the AP that has the transmitted BSSID in the same multiple BSSID set from the immediately prior TBTT of the reporting AP that transmits the RNR element.

8. The method according to claim 6, wherein the TBTT information field further comprises:
   a Short SSID subfield that is computed based on the SSID of the reported AP.

9. The method according to claim 6, wherein the reported AP is on a 6 GHz band, and wherein the reporting AP is on a 2.4 GHz band or a 5 GHz band.

10. The method according to claim 6, wherein the RNR element further comprises at least one of the following:
    a signal indicative of whether the reported AP is co-located with the reporting AP, wherein the reported AP being co-located with the reporting AP corresponds to the reported AP and the reporting AP being in a same physical device; or
    a signal indicative of whether the reported AP and the reporting AP that transmits the RNR element are in a multiple bands supported device.

11. A communication apparatus, wherein the communication apparatus comprises a reporting access point (AP), the communication apparatus comprising:
    a processor; and
    a memory storing processor-executable instructions that, when executed by the processor, cause the communication apparatus to:
       generate a Reduced Neighbor Report (RNR) element carried in a management frame, the RNR element comprising a target beacon transmission time (TBTT) information field for a reported AP, wherein the TBTT information field for the reported AP comprises a basic service set identifier (BSSID) subfield for the reported AP and a neighbor AP TBTT offset subfield for the reported AP; and
       transmit the RNR element;
    wherein in response to the BSSID subfield for the reported AP being set to a non-transmitted BSSID in a multiple BSSID set, the neighbor AP TBTT offset subfield for the reported AP is set to a value of a TBTT offset of an AP that has a transmitted BSSID from an immediately prior TBTT of the reporting AP that transmits the RNR element, and wherein the AP that has the transmitted BSSID is in the multiple BSSID set that comprises the reported AP, but the AP that has the transmitted BSSID is not the reporting AP;
    wherein in response to the BSSID subfield for the reported AP being set to a transmitted BSSID in a multiple BSSID set or being set to a BSSID that is not in a multiple BSSID set, the neighbor AP TBTT offset subfield for the reported AP is set to a value of a TBTT offset of the reported AP from the immediately prior TBTT of the reporting AP that transmits the RNR element; and
    wherein within the multiple BSSID set the AP that has the transmitted BSSID is the only AP that is allowed to transmit a beacon frame or a probe response, and wherein the reported AP that has the non-transmitted BSSID is not allowed to transmit a beacon frame or a probe response.

12. The communication apparatus according to claim 11, wherein the TBTT information field further includes a basic service set (BSS) Parameters subfield that comprises a Multiple BSSID subfield and a Transmitted BSSID subfield; and
    wherein the Multiple BSSID subfield is set to 1 and the Transmitted BSSID subfield is set to 0, wherein the neighbor AP TBTT offset subfield is set to indicate an offset in time units (TUs), rounded down to the nearest TU, relative to the next TBTT of the AP that has the transmitted BSSID in the same multiple BSSID set from the immediately prior TBTT of the reporting AP that transmits the RNR element.

13. The communication apparatus according to claim 11, wherein the TBTT information field further comprises:
    a Short SSID subfield that is computed based on the SSID of the reported AP.

14. The communication apparatus according to claim 11, wherein the reported AP is on a 6 GHz band, and wherein the reporting AP is on a 2.4 GHz band or a 5 GHz band.

15. The communication apparatus according to claim 11, wherein the RNR element further comprises at least one of the following:
    a signal indicative of whether the reported AP is co-located with the reporting AP, wherein the reported AP being co-located with the reporting AP corresponds to the reported AP and the reporting AP being in a same physical device; or
    a signal indicative of whether the reported AP and the reporting AP that transmits the RNR element are in a multiple bands supported device.

16. A communication apparatus, wherein the communication apparatus comprises a station, the communication apparatus comprising:
- a processor; and
- a memory storing processor-executable instructions that, when executed by the processor, cause the communication apparatus to:
  - receive a Reduced Neighbor Report (RNR) element carried in a management frame, wherein the RNR element comprises a target beacon transmission time (TBTT) information field for a reported access point (AP), wherein the TBTT information field for the reported AP comprise a basic service set identifier (BSSID) subfield for the reported AP and a neighbor AP TBTT offset field for the reported AP; and
  - process the RNR element;
- wherein in response to the BSSID subfield for the reported AP being set to a non-transmitted BSSID, the neighbor AP TBTT offset subfield is set to a value of a TBTT offset of an AP that has a transmitted BSSID from an immediately prior TBTT of a reporting AP that transmits the RNR element, and wherein the AP that has the transmitted BSSID is in the multiple BSSID set that comprises the reported AP, but the AP that has the transmitted BSSID is not the reporting AP;
- wherein in response to the BSSID subfield for the reported AP being set to a transmitted BSSID in a multiple BSSID set or being set to a BSSID that is not in a multiple BSSID set, the neighbor AP TBTT offset subfield for the reported AP is set to a value of a TBTT offset of the reported AP from the immediately prior TBTT of the reporting AP that transmits the RNR element; and
- wherein within the multiple BSSID set the AP that has the transmitted BSSID is the only AP that is allowed to transmit a beacon frame or a probe response, and wherein the reported AP that has the non-transmitted BSSID is not allowed to transmit a beacon frame or a probe response.

17. The communication apparatus according to claim 16, wherein the TBTT information field further includes a basic service set (BSS) Parameters subfield that comprises a Multiple BSSID subfield and a Transmitted BSSID subfield; and
- wherein the Multiple BSSID subfield is set to 1 and the Transmitted BSSID subfield is set to 0, wherein the neighbor AP TBTT offset subfield is set to indicate an offset in time units (TUs), rounded down to the nearest TU, relative to the next TBTT of the AP that has the transmitted BSSID in the same multiple BSSID set from the immediately prior TBTT of the reporting AP that transmits the RNR element.

18. The communication apparatus according to claim 16, wherein the TBTT information field further comprises:
- a Short SSID subfield that is computed based on the SSID of the reported AP.

19. The communication apparatus according to claim 16, wherein the reported AP is on a 6 GHz band, and wherein the reporting AP is on a 2.4 GHz band or a 5 GHz band.

20. The communication apparatus according to claim 16, wherein the RNR element further comprises at least one of the following:
- a signal indicative of whether the reported AP is co-located with the reporting AP, wherein the reported AP being co-located with the reporting AP corresponds to the reported AP and the reporting AP being in a same physical device; or
- a signal indicative of whether the reported AP and the reporting AP that transmits the RNR element are in a multiple bands supported device.

* * * * *